United States Patent [19]

Hobbiebrunken et al.

[11] Patent Number: 5,406,761
[45] Date of Patent: Apr. 18, 1995

[54] ROOM-SPACE PARTITION MADE OF MOVABLE WALL ELEMENTS

[75] Inventors: Klaus Hobbiebrunken, Westerstede; Rolf Kalischewski, Elsfleth; Rolf Brunkhorst, Oldenburg; Werner Klein, Wilhelmshaven; Bernd-Jurgen Kappe, Oldenburg, all of Germany

[73] Assignee: Huppe Form Sonnenschutzund Raumtrennsysteme GmbH, Oldenburg, Germany

[21] Appl. No.: 75,761

[22] Filed: Jun. 11, 1993

[30] Foreign Application Priority Data

Jun. 19, 1992 [DE] Germany .......... 42 19 977.8
Jun. 19, 1992 [DE] Germany .......... 92 08 164.9 U

[51] Int. Cl.⁶ .......... E04H 1/00; E05D 15/06
[52] U.S. Cl. .......... 52/243.1; 160/214; 160/196.1
[58] Field of Search .......... 160/32, 214, 196.1; 52/238.1, 243.1

[56] References Cited

U.S. PATENT DOCUMENTS

| | | | |
|---|---|---|---|
| 2,929,445 | 3/1960 | Haws | 160/32 |
| 3,298,143 | 1/1967 | Rogers et al. | 52/243.1 |
| 3,683,100 | 8/1972 | Deal et al. | |
| 4,205,498 | 6/1980 | Unayama | |
| 4,535,578 | 8/1985 | Gerken | 52/243.1 |
| 4,972,634 | 11/1990 | Dresden | |
| 5,172,742 | 12/1992 | Iwasaki et al. | 160/32 |
| 5,193,319 | 3/1993 | Classen et al. | 52/243.1 |

FOREIGN PATENT DOCUMENTS

| | | |
|---|---|---|
| 54733/80 | 7/1981 | Australia . |
| 2404875A1 | 8/1975 | Germany . |
| 8509040.9U1 | 6/1986 | Germany . |
| 3802113A1 | 3/1988 | Germany . |
| 459954 | 6/1951 | Italy .......... 160/196.1 |

Primary Examiner—Carl D. Friedman
Assistant Examiner—Wynn Wood
Attorney, Agent, or Firm—Merchant & Gould, Smith, Edell, Welter & Schmidt

[57] ABSTRACT

A room partition is made of wall elements, which can be moved and be brought in tight contact, with their vertical front sides, with each other, and with locking elements. The wall elements are movable with the aid of suspension assemblies along a first track (10) and at least along a second track (4), whereby the first track (10) branches from the second track (4), and whereby with the first track (10), along which it can move, is associated a conveying mechanism (12) to which are attached catches (30) that, for the transportation of a wall element along the first track (10) can be brought in detachable engagement with its suspension assemblies. For transition of a wall element between the first and the second track (10,4), each catch (30) can be swung toward or away from a suspension assembly (6) of the wall element present in the branch point (34), in order to be engaged with or detached from this suspension assembly.

32 Claims, 6 Drawing Sheets

ROOM-SPACE PARTITION MADE OF MOVABLE WALL ELEMENTS

BACKGROUND OF THE INVENTION

The invention relates to a room partition made of wall elements—which can be moved and brought in tight contact, with their vertical front sides, with each other or locking elements—that, with the aid of suspension assemblies, can be moved along a first track and at least along a second track, whereby the first track branches from the second track, and whereby with the first track, along which it can be moved and driven—is associated a conveying mechanism to which catches are attached that can be brought in detachable engagement with the suspension assemblies of the first track, in order to transport a wall element along the first track.

From DE 40 26 098 A1 is known, for instance, a room separation of the kind in which the first track forms a part of a magazine for parking the wall elements and the second track is the guide track for assembling the room partition. In order to move a wall element out of the magazine and, thus, for the transition of this wall element from the first to the second track, first the conveying mechanism is started to advance the wall element along the first track up to the branch point of the second track.

The catches attached to the conveying mechanism are engaged with a suspension assembly of the wall element. When the suspension assembly of the wall element has reached the branch point, a switching contact is actuated by the wall element that switches off the conveying mechanism. Only then can the suspension assembly be detached from the appertaining catch and the wall element can be moved along the second track.

Even though this device has proved to be effective in practice until now, yet there is a need to realize a steady transition of the wall elements between the first and the second track without the conveying mechanism having to be switched off along the first track.

SUMMARY OF THE INVENTION

This problem is solved according to the invention in that in a room partition of the type mentioned in the beginning—for the transition of a wall element between the first and the second track—each catch can be tilted toward or away from a suspension element of the wall element present in the branch point to engage with this suspension assembly or to be detached from it.

The arrangement according to the invention has the advantage that a steady progression is possible during the transition of a wall element between the first and the second track. This is achieved according to the invention in that the catches attached to the conveying mechanism are tiltable.

In particular, the catches can thus be swung out of the path of motion of the wall element—which has just moved from the first onto the second track—along the second track so as not to hamper the movement of the wall element along the second track following after the transition from the first to the second track.

Moreover, as a result of the arrangement according to the invention, switching off the conveying mechanism is superfluous while a catch is engaged with or detached from a suspension assembly of a wall element located in the branch point. Rather, because of the tiltable arrangement of the catches according to the invention, the motion of the conveying mechanism can be continual, which also contributes to a steady transition of a wall element between the first and the second track.

Preferably, the path of motion of the conveying mechanism ahead of the branch point shows a curved section that leads away from the latter and, preferably, the catches are fixed to the conveying element in a fixed position to the latter. Thus, in this construction, also the swinging motion of the catch is brought about by the conveying mechanism itself when the latter passes through the curved section of its path of motion.

Advisedly, the path of motion shows a section running parallel to the first track, which is followed by the curved section. Should a wall element be moved along the first track, a catch is in undetachable engagement with a suspension assembly of this wall element as long as this catch is moved along the parallel section of the path of motion by the conveying mechanism.

In a presently especially preferred further development, each catch has an engagement section that is provided on the side of the catch facing away from the curved section of the path of motion of the conveying mechanism. Thereby, the realization of the detachment of an engagement with the suspension assembly of a wall element present in the branch point is possible in an especially simple manner.

An especially simple and simultaneously effective construction is attained in that the catches are developed as hook-shaped elements whose engagement sections are formed as concave recesses in order to be able to detachably encompass a section of the suspension assemblies provided for this purpose.

According to a presently especially preferred construction, the catches are attached to the conveying mechanism in such a manner that the engagement section of each catch, which is in position for the engagement with a suspension assembly of a wall element in the branch point, always points in the direction of motion of the wall element along the second track.

This arrangement has the advantage that, by moving the wall element along the second track, its suspension assembly can easily be detached from the catch. Especially when the catches are developed as hooks, the wall element with its suspension assembly can be pushed out of the catch along the second track.

Preferably, the catches are attached to the conveying mechanism with one end and are provided with the engagement section at their other free end. In that kind of an arrangement, the tilting motion of the catches for the engagement or the detachment can be realized precisely at relatively small radii of curves.

From this point of view it is also favorable to arrange the catches in such a manner that they point, with their free end, in the direction of motion of the conveying mechanism for the transportation of the wall elements from the first to the second track. Moreover, an especially space-saving construction and arrangement of the catches results when they are developed as elongated flat elements.

Advisedly, the conveying mechanism is an endless element that preferably runs around a guide pulley, ahead of the branch point, in order to produce the swinging motion of the catches attached to it.

Also associated with the second track is, generally, a second conveying mechanism, which can be moved and driven along it and to which also catches are attached that, for the transportation of the wall element along the second track, can be brought in detachable engagement with its suspension assemblies. As already mentioned, this kind of an arrangement is known from DE 40 26 098 A1.

In that kind of construction, it is of advantage if the catches of the first conveying mechanism and the catches of the second conveying mechanism are arranged and developed in such a manner that, in each case, a catch of the first conveying mechanism and a catch of the second conveying mechanism can be brought to engage simultaneously with a suspension assembly of a wall element located in the branch point, thus making possible an especially smooth transition of the wall element between the first and the second track.

In order that the catches of the first and the second conveying mechanism do not interfere with each other during the transition of the wall element between the first and the second track, the catches of the first conveying mechanism and the catches of the second conveying mechanism are advisedly arranged at different heights.

According to another especially preferred construction, the suspension assemblies of the wall elements are provided with pins with which the catches can be brought in detachable engagement. Preferably, the pins are shaped cylindrically, and the engagement sections are developed as corresponding to approximately semicircular recesses.

If a magazine is used for parking the wall elements—as is also the case, for instance, in the room partition according to DE 40 26 098 A1—the magazine contains the first track.

A preferred construction—in which the magazine contains, in addition, a third track that also branches from the second track, each of the wall elements is provided with two suspension assemblies; the first track and the third track show a distance between each other that corresponds to the distance between the two suspension bolts of the wall elements; and a conveying mechanism, with the catches attached to it, is associated with the third track—distinguishes itself by the fact that the conveying mechanism and the catches are arranged and developed in the same manner as the conveying mechanism and the appertaining catches for the first track.

Advisedly, a catch of the first track and a catch of the second track form a pair with substantially the same distance to the second track. The catches of a pair can be tiltable in the same direction. This construction has the advantage that, with a hook-shaped development of the catches, the suspension assemblies can be pushed out of the catches when, after the transition from the first to the second track, the wall elements are to be moved along the latter.

Alternately, the catches of one pair can also be tiltable in opposite directions. This counter-current mode of operation has the advantage that the catches exert a centering force on the suspension assemblies of a wall element moved from the first and the third track to the second track, in order to be able to adjust the wall element correctly in the second track.

Indeed, in this construction, one always has to make sure that the catches are basically completely swung out of the range of the second track until the wall element can be moved unimpeded along the second track.

According to another aspect, the invention relates to a room partition made of movable wall elements that can be moved to closely adjoin each other with their vertical front sides along a guide rail, by way of a drive unit, whereby the drive unit shows an activatable endless element placed in or along the guide track with which the wall elements can be brought to engagement.

Even though the device known from DE 40 26 098 A1—which, in particular, allows a simple and quick transportation of the wall elements, also diagonally—has proved to be effective in practice, yet the need for a simplification of the drive unit exists, especially for those models of room partitions in which no diagonal transportation of wall elements across is required.

Therefore, that kind of room partition is developed in such a way that the endless element extends only along a limited section of the guide rail and propels a wall element only along this section, and that the wall elements are provided with connecting elements for a detachable, front-side connection with each other.

Contrary to the state of technology in which the wall elements are engaged with the drive unit over the entire stretch of the guide track, the endless element developed according to this invention moves each wall element along only a limited section of the guide rail.

Thereby it is possible to construct the drive unit more simply and, thus, also more moderately in price, which not only has a positive effect on the production cost of the entire room partition but also on the expenditures for the maintenance necessary for operation that can be reduced because of the simplification of the drive unit.

Although the endless element operates only along a limited section of the guide rail, the advance of those wall elements that are no longer driven by the endless element and, thus, are located outside the effective range of the drive unit, is guaranteed by the connecting means according to the invention.

These connecting means are provided for a detachable front-side connection of the wall elements, located outside the effective range of the drive unit, with each other and with the wall element(s) propelled by the endless element.

Thus, the individual wall elements are connected to each other by the connecting means, whereby the now-connected wall elements can be moved as a unit—like a sliding wall—by the fact that, in each case, at least one of the wall elements is directly propelled by the endless element.

During the assembly of the room partition, the individual wall elements are connected successively and moved because of the fact that, in each case, the last wall element is moved against the wall element that precedes it and is no longer propelled by the endless element; butts against this wall element; and is coupled to it with the aid of the connecting means, with the result that gradually a unit of connecting wall elements moved like a sliding wall is generated that forms the room partition.

In the process, in each case the last wall element—that is directly propelled by the endless element—pushes the other wall elements connected with it along the guide rail, during their motion.

However, during the assembly of the room partition, the wall elements connected with each other are pulled by the front-most wall element, seen in the direction of motion, because this arrives first in the effective range of the endless element and is propelled by the latter.

Advisedly, the connecting means then undo the connection with the next wall element when the latter is also again propelled by the endless element with the result that the preceding and now detached wall element can, for instance, be stored in a magazine.

In a model with a magazine for parking the wall elements, in which the guide rail is guided past the magazine, the endless element is preferably placed in the area of the magazine and developed in such a manner that it always propels at least the wall element that has just been moved out of the magazine or has to be moved into it.

If a magazine for parking the wall elements is provided, the endless element preferably extends at least partially over the area of the magazine facing the feed track. Usually, the wall elements are hung, in each case, on at least two suspension assemblies that can be moved in the guide track and rotated around suspension bolts.

The magazine can have at least two tracks running parallel to each other that adjoin the feed track angularly or transversely and whose distance from each other is calculated in such a way that, in each case, only one suspension assembly of a wall element located in the magazine is guided in a track.

As a consequence, the motion of the wall elements within the magazine takes place angularly or transversely to the motion of the wall elements along the guide track; therefore, the wall elements are moved into or out of the magazine on the side of the guide track. Advisedly, the endless element extends at either side of the branch point of a track of the magazine from the guide track.

For that purpose, the connecting means can be developed in such a manner that the wall elements are successively connected with each other when moved out of the magazine and successively detached from each other when moved into the magazine.

Preferably, the connecting means show pins and eyes of which, in each case, a pin on a wall element is aligned with an eye on the adjacent element and can be inserted in that eye.

To the extent that the wall elements can be moved angularly or transversely to the guide track in the magazine, the pins should advisedly extend substantially in the direction of the motion of the wall elements in the magazine.

This has the advantage that, when the wall elements are moved out of the magazine, a connection between the wall elements is automatically produced—namely, by the fact that a pin of the one wall element engages with an eye of an adjacent wall element. In a similar, but reversed manner, the wall elements can be separated when they are moved into the magazine—namely, by the fact that the pins are pulled out of the eyes.

Alternately, the connecting means can also have hooks.

Because the wall elements can be brought to join each other with their front sides, the connecting means should advisedly also be attached to the front sides of the wall elements. The guide track can have a straight, but also an at least slightly curved course.

BRIEF DESCRIPTION OF THE DRAWINGS

In the following, preferred construction examples of the invention are explained in more detail using the enclosed drawing. Shown are.

DETAILED DESCRIPTION OF THE PREFERRED EMBODIMENT

Figure 1:
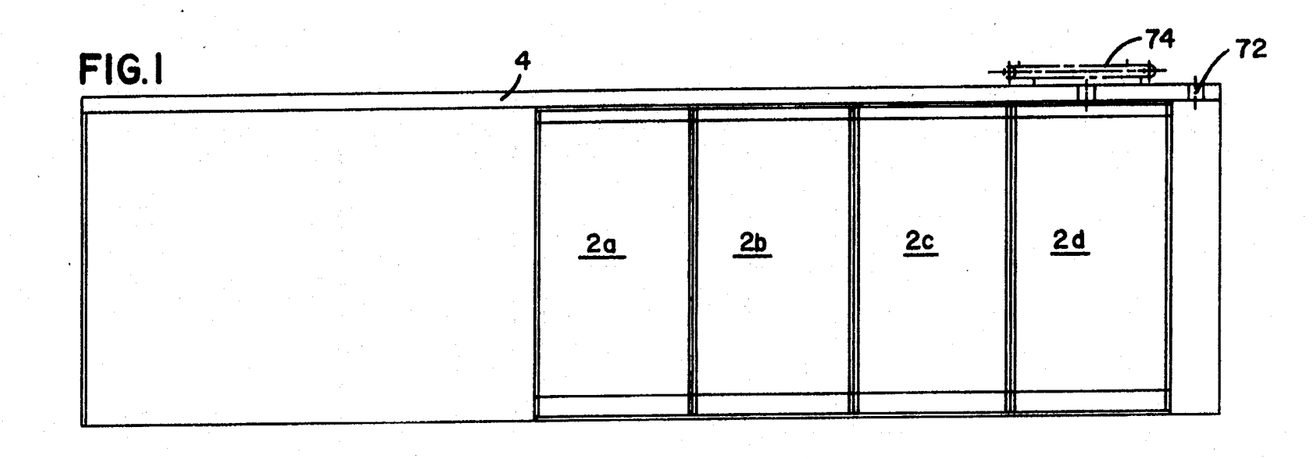
FIG. 1 A lateral view on wall elements of a room partition connected with each other.
Figure 2:
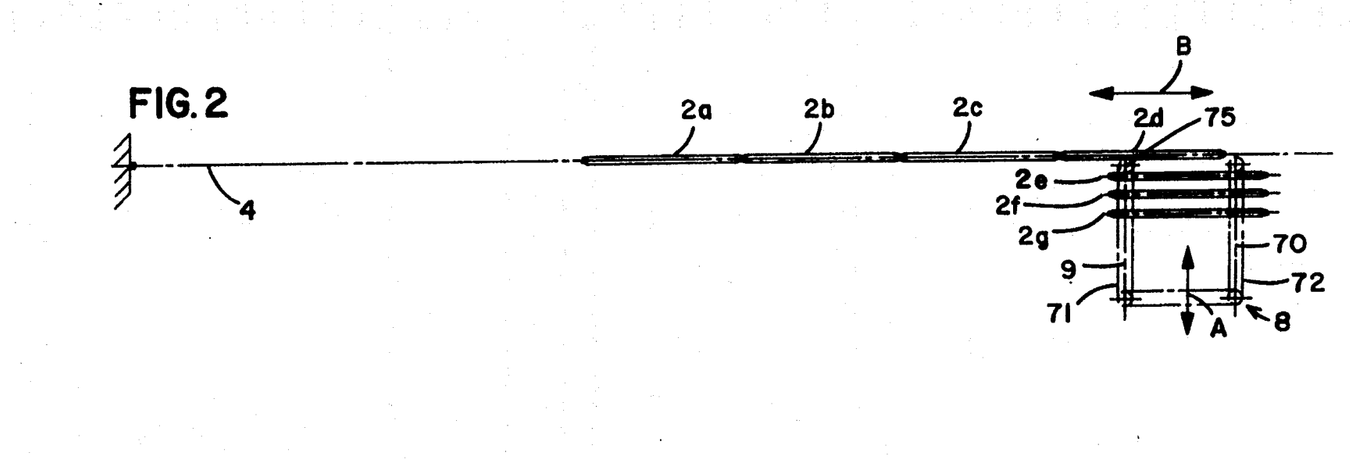
FIG. 2 A diagrammatic top view on the arrangement of FIG. 1.

As FIG. 1 and 2 show, the room partition represented there consists of several movable wall elements 2a-g. The wall elements usually consist of a metal frame and two cover plates attached to the latter at each side, whereby the frame shows an upper and a lower cross beam and two front profile moldings connecting them. The frame, the cover plates, the cross beams, and the profile moldings are not individually named and represented in more detail in the figures.

The wall elements can be moved along a guide track (4) that is attached, for instance, to a ceiling of the room. To the upper cross beam are attached—as can be gathered from FIG. 4—suspension bolts (5) at whose upper ends suspension assemblies (6), developed as a roller carriages in the present case, are mounted so they can rotate.

Each suspension assembly is equipped, in the familiar manner, with rollers that run on or in the guide track (4). Consequently, the wall elements in the represented model are hung on the suspension assemblies (6) that run in the guide track. Usually, each of the wall elements (2a-g) is hanging on two suspension assemblies (6).

At the beginning of the guide track (4)—as can be gathered especially from FIG. 2—a magazine (8) for "packaging" the wall elements is provided that contains two parallel track sections (9, 10) that branch perpendicularly from the guide track (4) and show a distance from each other that corresponds to the distance between two suspension assemblies (6) provided on a wall element.

In FIG. 2, for simplicity's sake, the guide tracks (4) and the track sections (9, 10) of the magazine (8) are indicated only by dash-dot lines. At each of the two track sections (9, 10) of the magazine (8), an endless element (11, 12) is mounted that turns around a guide pulley (26) and is driven by a motor (28) (compare FIG. 5).

The wall elements present in the magazine—thus, the wall elements 2e, f, and g, according to FIG. 2—are hanging with their roller carriage on the track sections (9 and 10) and are engaged with the endless elements (11 and 12) by way of catches, which are not represented in more detail, with the result that they are moved within the magazine (8) transverse to their longitudinal extension, in the direction of arrow A when the endless elements (11, 12) are actuated.

On the contrary, the wall elements are moved in the direction of their longitudinal extension, along the guide track (4) as indicated in FIG. 2 by arrow B. For this purpose, an endless element (14) is provided—which is driven by a not-represented motor and runs over rollers that are not indicated in more detail—that is placed in, or according to FIG. 1, adjacent to the guide track (4).

In order that the wall elements can be moved by the endless element (14), the wall elements engage with the endless element (14) by way of not-represented catches.

The effective length of the endless element (14)—thus, the length defined by the distance between the two rollers and, thus, corresponding to the length of one strand—amounts to only a fraction of the total length of the guide track (4), as can be noticed in FIG. 1. In the represented construction, the effective length of the endless element (11) corresponds approximately to the length of one wall element.

In addition, the endless element (14) is placed in such a manner that it extends partially over the area of the magazine (8) facing the guide track (4)—that is, at each side of the branch point (15) of the track (9) from the guide track (4). Thereby, a friction-less transition is possible in the movement of a wall element between the guide track (4) and the magazine (8).

On the front sides, the wall elements are provided with connecting means that make possible a front-side coupling of the wall elements to each other. In the construction represented in FIG. 3, the connecting means consist of pegs (16) and eyes (18). The pins (16) are located at the one front side of the wall elements and the eyes (18) at the opposite front side.

Figure 3:
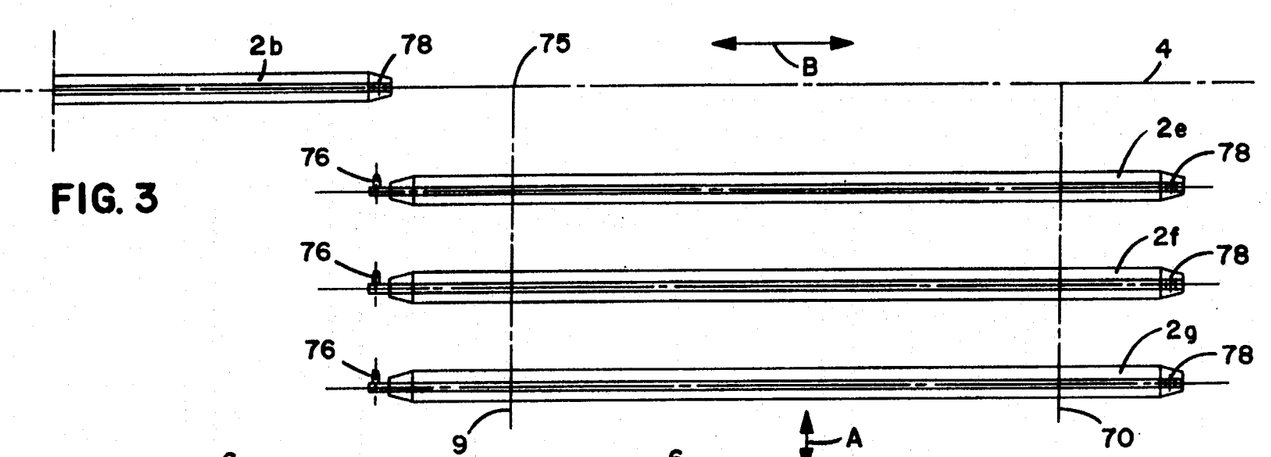
FIG. 3 A top view on an enlarged individual view of the connecting area between the magazine and the guide track.

In addition, the pins (16) and the eyes (18) extend in the direction A of the motion of the wall elements in magazine (8) and, thus, rectangularly to the guide track (4), and are mounted at the same height with the result that, in each case, a pin (16) on a wall element is aligned with an eye (18) on the adjacent wall element if the two wall elements are in a position as, for instance, the wall elements (2d and 2e) represented in FIG. 3.

According to FIG. 3, the wall element (2d) is already hanging on the guide track (4) and is moved so far out of the area of magazine (8) that its eye (18) is aligned to pin (16) of the next wall element (2e), which is still in the magazine. If wall element (2e) is further advanced in the direction toward the guide track, its pin (16) ultimately engages the eye (18) of wall element (2d), when wall element (2e) is moved on the guide track (4) and is now hanging on the latter. In a similar but reverse manner, wall element (2e) can be detached from wall element (2d) when it is to be moved into magazine (8).

At this point it should once again be pointed out that the pins (16) and the eyes (18) are provided, in the previously described arrangement, on each of the wall elements (2a–g) and take care of a front-side coupling of the wall elements if these are hanging on the guide track (4).

Figure 4:
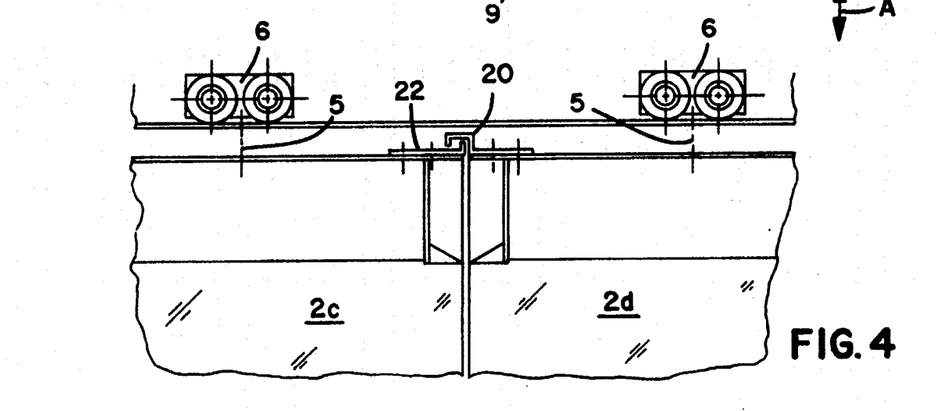
FIG. 4 A lateral view on the upper sections of two connected wall elements.

FIG. 4 shows another preferred construction form of the connecting means.

In this construction, in each case, instead of pins and eyes, a pair of hooks (20 and 22) is provided that is attached to the cross-beam of the wall elements. The one hook (20) is fastened adjacent to the one front side and the other hook (22) is fastened adjacent to the other front side of the respective wall element with the result that, when the wall elements are connected, the two hooks (20 and 22) of each pair are always located opposite each other.

The hooks (20 and 22) are developed in such a way that they engage with each other when the respective wall elements are moved transverse to their longitudinal extension—that is, when the one wall element is already hanging in the guide track (4) and, like the wall element (2d) shown in FIG. 3, is located just outside the area of magazine (8), and the other wall element is moved out of magazine (8) as the next element (like wall element 2e, according to FIG. 3) in the direction toward the guide track (4).

In a similar but reverse manner, the engagement between the hooks (20 and 22) can be detached again.

For the assembly of the room partition, the wall elements are now moved out of the magazine (8) one after the other. During the transition from the track sections (9, 10) of magazine (8) to the guide track (4), the wall element is coupled in the previously described manner to the wall element that precedes and has already been moved out of the range of magazine (8) and simultaneously engages with the endless element (14) that now propels this wall element and transports it out of the range of magazine (8) but then stops, with the result that the wall element remains in the position of the wall element (2d), shown in FIG. 3, in order to be prepared for coupling with the next wall element moving out of magazine (8).

In this manner, the wall elements are gradually connected with each other with the result that the wall elements that are already connected to each other (2a–d, according to FIG. 1) are always pushed forward—with the aid of the endless element (14)—as a unit, like a sliding wall, by in each case the last wall element that was just removed last from the magazine (8), like wall element (2d) according to FIG. 1.

To disassemble the room partition, the now-connected wall elements are pulled from that wall element in the area of magazine (8), which is already engaged with the endless element (14) and is moved into magazine (8) as the next wall element. When being moved into magazine (8), the wall element is detached from the next wall element that is still hanging on track (4) and is also already engaged with endless element (14).

In this manner, the wall elements are pulled within the range of magazine (8) by the endless element (14), one after the other, where they then are separated from each other during the transition from the guide track (4) to the track sections (9, 10) of magazine (8) while changing their direction of motion by 90°.

At this point it should be noted that the wall elements in magazine (8) can also be moved manually instead of by the endless elements (11, 12) in the direction of the double arrow A. Also other models of connecting means are conceivable that become engaged with each other not by transverse motion of the wall elements, but by collision of the front sides.

Figure 5:
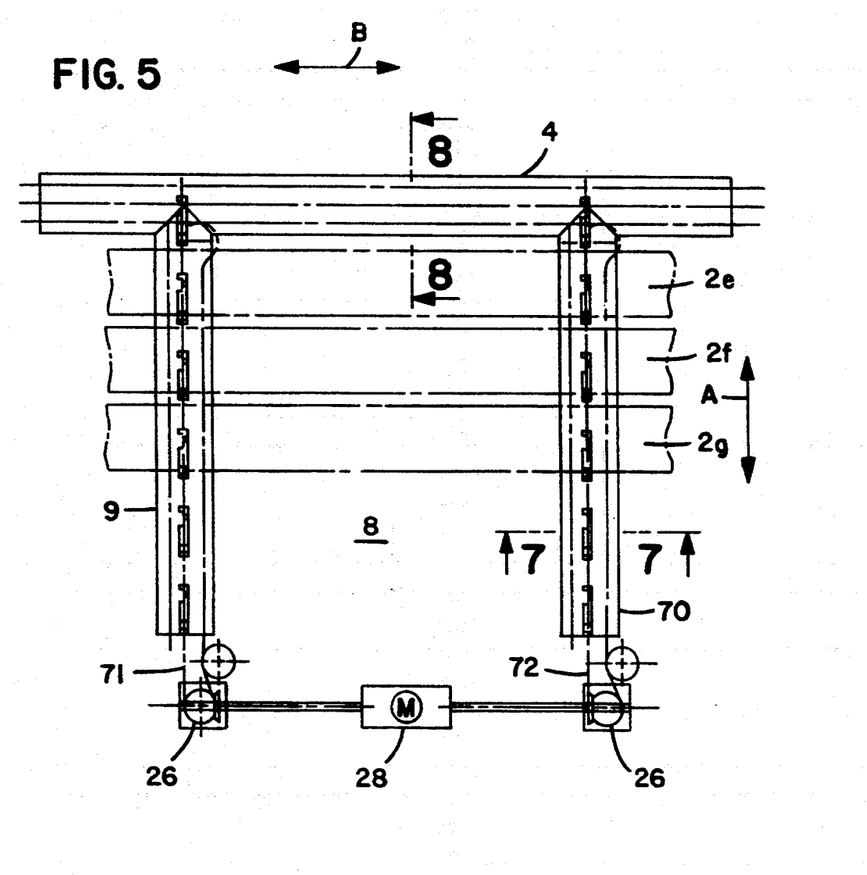
FIG. 5 A diagrammatic view, from below, on a track system in the area of the magazine.

As can be clearly noticed in FIG. 5, the endless elements (11 and 12) that turn around guide pulleys (26) are mounted in the track sections (9 and 10) of magazine (8). The guide pulleys (26) are synchronously driven by motor (28), whereby the two endless elements (11 and 12) are moved synchronously—thus, in the same direction and with the same speed.

Figure 6:
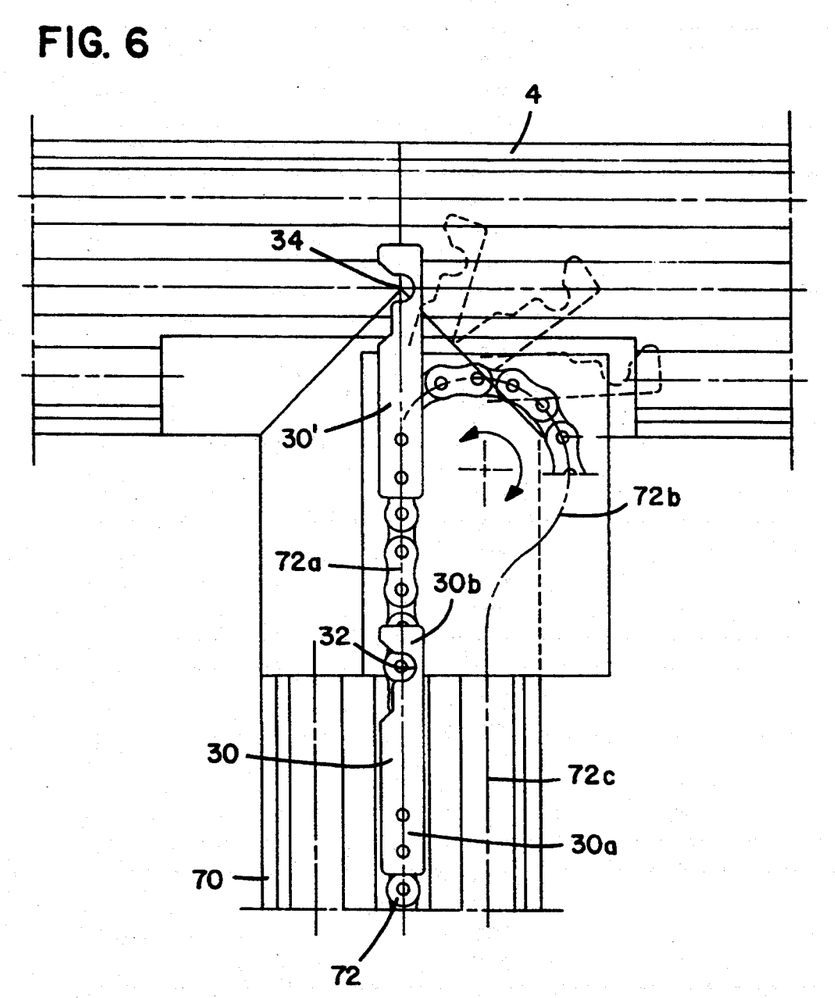
FIG. 6 An enlarged individual representation of a branch of a track section of the magazine from a guide track of FIG. 1.

In the construction example described here, each of the endless elements (11 and 12) consists of an endless chain with individual chain links—as FIG. 6, in particular, shows. However, alternately, also an endless rope or belt can be provided.

Several catches (30) are attached to each endless element (11 and 12). As will be described in more detail in the following, the catches (30) are developed for a detachable engagement with the pins provided on the suspension assemblies of the wall elements. Thereby they are able to move the wall elements (2e–g)—indicated in FIG. 5, in broken lines—inside the magazine (8) along the track sections (9, 10) in the direction of the double arrow A when the endless elements (11, 12) are propelled by motor (28).

Each of the endless elements (11, 12) has the same number of catches (30) whereby, in each case, a catch of the first endless element (11) and a catch of the second endless element (12) form a pair and show basically the same distance to the guide track (4) in each position during the movement of the endless elements (11, 12).

As can be noticed clearly, especially in FIG. 6, the catches (30) are developed as basically rectangular elongated flat elements that, in each case, are attached with their one end (30a) to a chain link of the endless element and are provided, at their other free end (30b), with basically semi-circular recesses (32). With the aid of the semi-circular recesses (32) the catches (30) can be detachably hooked onto the pins provided on the suspension assemblies of the wall elements.

The driver pins are developed cylindrically and have such a diameter that they can be enveloped basically halfway by the semi-circular recesses (32) of the catches (30).

As is shown in particular in FIG. 6, the endless element (12) runs, in the represented construction, with its one strand about in the center in the track section (10) and along a straight section of the movement route (12a) running parallel to the latter.

This section of the movement route (12a) is adjoined by a curved section (12b) along which the endless element (12) is deflected by about 225° with the aid of a not-represented guide roller and then again re-directed by about 45% in the opposite direction, with the result that the other strand of the endless element (12) runs along a section of the movement route (12c) that adjoins the curved section (12b) and runs parallel to the section of the movement route (12a).

The curved section (12b) of the movement route of the endless element (12) is located ahead of a branch point (34) that defines the intersection of the central axes of the guide track (4) and the track section (10). Because the section of the movement route (12a) of the endless element (12) runs along the central axis of the track section (10), the movement route section (12a) is aligned precisely to the branch point (34).

The catches (30) are fastened to the chain links in the longitudinal direction in such a manner that they are aligned with their free ends (30b) in the direction of the movement of the strand of the endless element (12) running along the movement route section (12a) on the guide track (4), and also directly toward the branch point (34).

In addition, as can be seen in FIG. 6, the catches (30) have a larger length than the chain links and, thus, protrude over the latter whereby, in the represented construction, the catches (30) are approximately three times as long as the individual chain links of the endless element (12).

The length of the catches (30) and the position of the recess (32) at their free end (30b) are chosen in such a way that the imaginary center of the semi-circular recess (32) lies on an axis that runs perpendicular to the guide track (4) and travels through the branch point (34) and, thus, lies in congruence to the branch point (34) when the chain link carrying the appertaining catch is located precisely at the end of the motion route section (12a) adjacent to the guide track (4) which runs in the center of the track section (10)—that is, immediately before it enters the curved section (12b) of the motion route of the endless element (12); this position is taken by the catch represented in FIG. 2 and is indicated with the reference number 30'.

As can be seen in FIG. 6, the semi-circular recess (32) opens up transverse to the longitudinal extension of the catch (30) to the side of the catch (30) that is opposite the curved section (12b) and the motion route section (12c) running eccentric in the track section (10) and, thus, in the direction of the guide track (4) and, thus, in the direction of the double arrow B shown in FIG. 5.

Moreover, the semi-circular recess (32) lies with its imaginary center on the longitudinal axis of the catch (30) and opens up, with increasing width, toward the side of the catch (30). When a catch is in the position of the catch (31) represented in FIG. 6, a suspension assembly of a wall element can be pushed with its driver pin into or out of the recess (32) by being moved along the guide track (4).

However, a catch in the position of the catch (30') shown in FIG. 6 is also detached by the swiveling of a suspension assembly of a wall element that is present in the branch point (34) in the guide track (4), as represented in broken lines in FIG. 6. In the process, the catch is swung out of the range of the guide track (4) after the chain link carrying the catch enters the curved section (12b) of the motion route of the endless element (12) during its continued motion and while it passes through the curved section (12b).

Because the catches (30) are attached to the chain links of the endless element (12), they also experience the radial movement when the appertaining chain links move through the curved section (12b).

Because the recess (32)—provided for the engagement with the driver pin of a suspension assembly of a wall element—opens up to the side opposite the curved section (12b), a swiveling in the direction of the curved section (12b)—therefore, according to FIG. 6, to the right—brings about that the catch is detached from a suspension assembly of a wall element present in the branch point (34).

In a reversed swivel motion, thus, with a swivel motion of the catch toward the branch point (34) (according to FIG. 6, to the left)—because the appertaining chain link of the endless element (12) moves through the curved section (12b) of the motion route of the endless element (12) and then along the motion route section (12a) provided centrally in the track section (4)—the catch in the position of the catch (30'), shown in FIG. 6, is hooked into the driver pin of a suspension assembly of a wall element present in the branch point (34) and now, during its continued motion along the motion route section (12a), pulls the suspension element from the guide track (4) onto the track section (10) and, thus, the appertaining wall element into the magazine (8) (compare FIG. 5).

At this point it should be pointed out that the track section (9), the appertaining endless element (11) and the catch attached to the latter (compare FIG. 5) are mounted and developed in the same manner as track section (10), the endless element (12), and the catches (30) attached to the latter, according to the previous description with the aid of FIG. 6.

The catches (30) attached to the endless elements (11 and 12) can operate in the same direction and be swiveled in the area of the branch of the track sections (9 and 10) from the guide track (4). This arrangement, shown in FIG. 5, has the advantage that the suspension elements present in the branch point (34) can be pushed in and out of the recesses (32) of the catches (30) when the catches are in the position of the catch (30') shown in FIG. 6.

However, the two endless elements (11 and 12) can also be arranged in such a manner and the catches (30) can be attached to them in such a way that the catches (30) act in opposition to each other and are swung in directions opoosite to each other.

In this construction, the arrangement represented in FIG. 6 is provided in a mirror image on the track section (9). That kind of an arrangement has the advantage that the catches (30) exert a centering force on the catches (30) that are present in the guide track (4).

Figure 7:
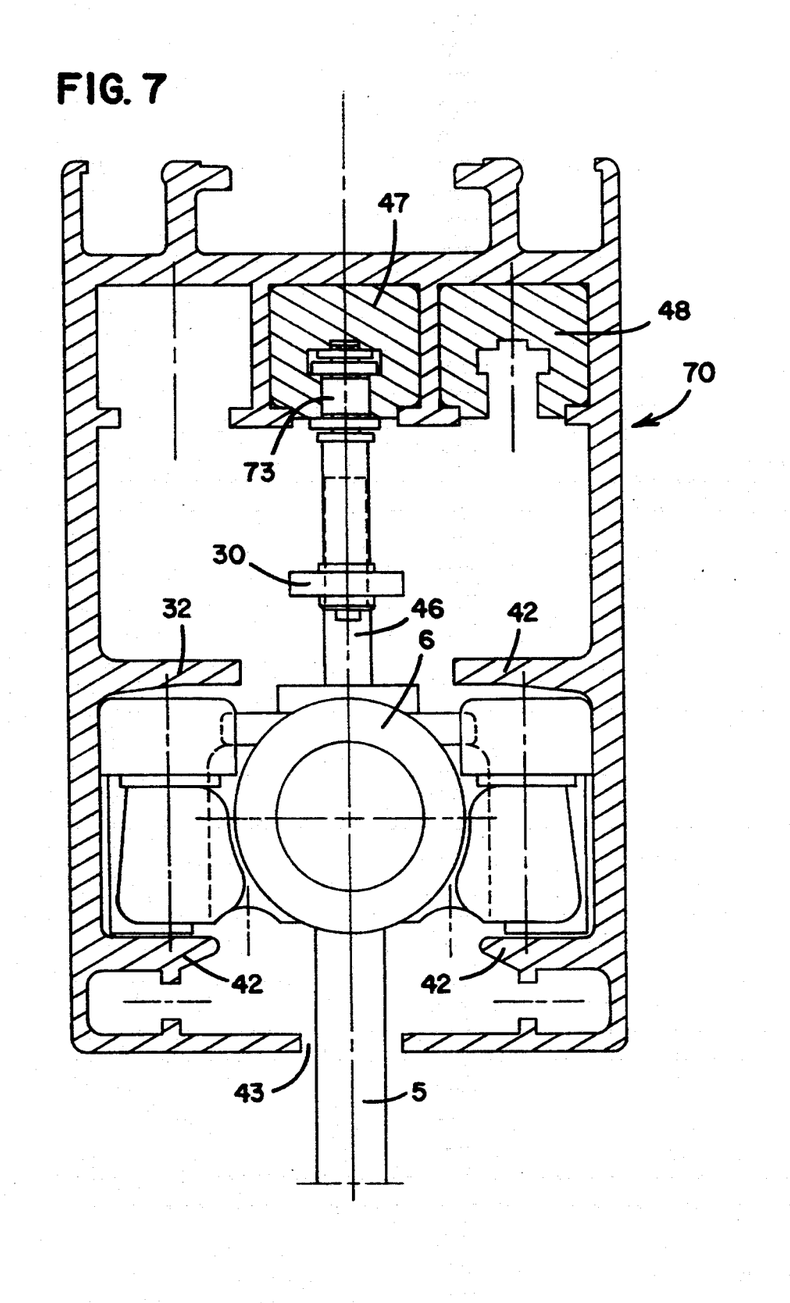
FIG. 7 A cross-section through a track section of the magazine along line VII—VII of FIG. 5.

FIG. 7 shows a cross-section through track section (10). In this figure, is shown the suspension assembly (6) that can be moved along a profile (44) developed in the track section (10).

At the underside of track section (10), a medial slot (43) running in the center, in the longitudinal direction, is provided through which extends the suspension bolt (5) by which the appertaining wall element is hung onto the suspension element (6). At its upper side, the suspension assembly (6) is provided with an upright, cylindrical driver pin (46) into which a catch (30) can be hooked, in the manner described previously.

At the upper side of the track section (10), a first sliding profile (47) is fastened centrally in which slides the one strand of the endless element (12) and which forms the central movement route section (12a) for it (compare FIG. 6).

In addition to the first sliding profile (47), a second sliding profile (48) is fastened eccentrically at the upper side of the track section (10) in which slides the other strand of the endless element (12)—which is not represented in FIG. 7, for clarity reasons—and which forms the movement route section (12c) for it (compare FIG. 6).

The sliding profile (47 and 48) show a slot, open downward, from which the endless element (12) protrudes with one part to which the catches (30) are attached by way of spacer tubes, below the endless element (12) and at a distance to the latter, as can be seen in FIG. 7. The track section (9) of magazine (8) is built up in the same manner as the track section (10).

Figure 8:
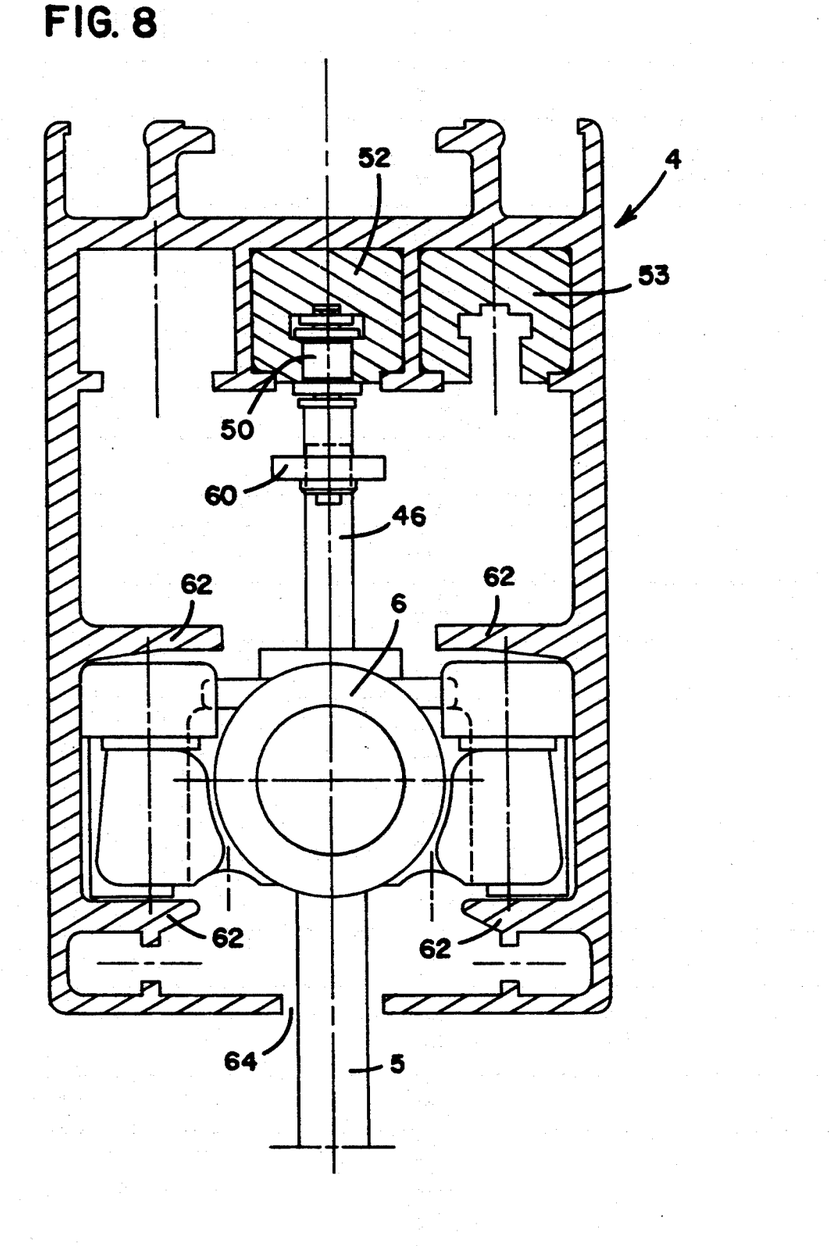
FIG. 8 A cross-section through the guide rail along line VIII—VIII of FIG. 5.

FIG. 8 shows a cross-section through the guide track (4). In the represented construction, a drivable endless element (50) is also foreseen in the guide track (4) that turns in one direction or the other whereby a not-represented driving motor propels this endless element (50).

One strand of the endless element (50) runs, in the represented construction form, in a sliding profile (52) attached centrally at the upper side of the guide rail (4). The other strand of the endless element (50)—which is not represented in FIG. 8, for clarity reasons—runs back outside the central axis of the guide rail (4) in a sliding profile (53), attached next to the sliding profile (52) at the upper side.

The endless element (50) is constructed in the same manner as the endless elements (11 and 12); the same counts also for the sliding profiles (52 and 53).

Also attached, at regular intervals, at the underside of the endless element (50) are catches (60) that reach behind the driver pin (46) of a suspension assembly (6) present in the branch point (34) and that, for the transportation of the appertaining wall element, move this along with continued motion of the endless element (50).

The guide track (4) shows basically the same cross-sectional dimensions as the track sections (9 and 10) of magazine (8). In particular, the suspension assemblies (6) are guided in a sliding profile (62) that is mounted at the same height as the sliding profile (42) of the track section (10) and the corresponding sliding profile of the track section (9).

The suspension bolts (5) extend through a central slot (64) running centrally in the longitudinal direction. On the contrary, as can be gathered from a comparison of FIG. 7 and 8, the catches attached to the endless elements (11 and 12) are mounted at a lower height than are the catches (60) attached to the endless element (50).

This arrangement has the advantage that catches (30) and catches (60) cannot interfere with each other when, during the transition of one of a wall element between the guide track (4) and the magazine (8), a catch (30) and a catch (60) are, in each case, simultaneously engaged, for a short time, with the driver pin (46) of a suspension assembly (6) of this wall element. Other than that, catches (60) can be developed and arranged in the same or similar manner as catches (30).

We claim:

1. Room partition, comprising:
   a plurality of wall elements having vertical front sides, the wall elements being movable and being brought in tight contact with the vertical front sides, with each other, and with a plurality of locking elements;
   the locking elements being movable with an aid of suspension assemblies along a first track and at least along a second track, whereby the first track branches from the second track, and whereby with the first track is associated a first conveying means;
   the first conveying means being movable and being driven along the first track, a plurality of catches being attached to the first conveying means;
   the catches, having a side, being brought in detachable engagement with the suspension assemblies for transportation of one of the wall elements along the first track; and
   wherein, for a transition of the wall element between the first and the second track, each of the catches is either swung toward or away from one of the suspension assemblies of the wall element present in a branch point in order to be either engaged with or detached from the suspension assembly.

2. Room partition according to claim 1, wherein a movement route of the first conveying means ahead of the branch point includes a curved section moving away from the the branch point, and the catches are fixed to the first conveying means in a predetermined position with respect to the conveying means.

3. Room partition according to claim 2, wherein the movement route includes a second section, running parallel to the first track, which is followed by the curved section.

4. Room partition according to claim 2, wherein each of the catches has an engagement section that is provided on the side of the catch that faces away from the curved section of the movement route of the first conveying means.

5. Room partition according to claim 4, wherein the catches are developed as hook-shaped elements that have the engagement section that is formed as a concave recess in order to be able to detachably enclose a section of the suspension assemblies.

6. Room partition according to claim 4, wherein the catches are mounted on the first conveying means in such a manner that the engagement section of each catch which is in position for engagement with the suspension assembly of the wall element in the branch point, always points in a direction of the second track and wherein, when the first conveying means is propelled for the transition of the wall element from the first track to the second track, each catch is swung away from the suspension assembly of the wall element present in the branch point, in order to detach the catch from the branch point.

7. Room partition according to claim 6, wherein each of the catches has a first end and a second end, the catches are attached to the first conveying means with the first end and are provided with the engagement section at the second end, which is a free end.

8. Room partition according to claim 7, wherein the catches are developed as elongated flat elements.

9. Room partition according to claim 7, wherein the catches, at the free ends, point in the direction of motion of the first conveying means, for the transportation of the wall elements from the first track to the second track.

10. Room partition according to claim 9, wherein the first conveying means is an endless element.

11. Room partition according to the claim 10, wherein a guide roller, around which the endless element rotates, is mounted ahead of the branch point.

12. Room partition according to claim 11, wherein a second conveying means is associated with the second track, the second conveying means being movable and propellable alongside the second track, to which the catches are attached, in order to transport the wall element along the second track, are in detachable engagement with the suspension assemblies, wherein the catches of the first conveying means and the catches of the second conveying means are arranged and developed in such a manner that, each catch of the first conveying means and each catch of the second conveying means being brought simultaneously in engagement with the suspension assembly of the wall element located in the branch point.

13. Room partition according to claim 12, wherein the catches of the first conveying means and the catches of the second conveying means are mounted at different heights.

14. Room partition according to claim 13, wherein the suspension assemblies of the wall elements are provided with a plurality of driver pins by which the catches are brought in detachable engagement.

15. Room partition according to claim 14, wherein the driver pins are formed cylindrically, and wherein the engagement sections are developed corresponding to about semicircular recesses.

16. Room partition according to claim 15, further comprising a magazine for parking the wall elements, wherein the magazine contains the first track.

17. Room partition according to claim 16, wherein the magazine contains, in addition, a third track that branches from the second track, each of the wall elements is provided with two suspension assemblies, the first track and the third track show a distance from each other that corresponds to a distance of the two suspension assemblies of the wall elements, and wherein a third conveying means is associated with the third track, the catches being attached to the third conveying means, wherein the third conveying means and the catches are arranged and developed in a same manner as the first conveying means associated with the first track and the catches attached to the first conveying means.

18. Room partition according to claim 17, each catch of the first conveying means associated with the first track, and each catch of the third conveying means associated with the second track, form a pair with basically a same distance to the second track.

19. Room partition according to claim 18, wherein the catches of the pair are swung in a same direction.

20. Room partition according to claim 18, wherein the catches of the pair are swung in an opposite direction.

21. Room partition according to claim 20, wherein the movable wall elements are movable along a guide track to tightly adjoin each other with the vertical front sides by way of a driving means, whereby the drive means includes a drivable endless element either mounted in or alongside the guide track by which the wall elements are made to engage, wherein the endless element extends only along a limited section of the guide track and propels one of the wall elements along one section, and wherein the wall elements are provided with connecting means for connecting a detachable front side of the wall elements with each other.

22. Room partition according to claim 21, further comprising a magazine for parking the wall elements, whereby the guide track passes by the magazine, wherein the endless element is mounted near the magazine and is developed in such a manner that the magazine always propels at least one of the wall elements that was either just moved out of the magazine or is moved into the magazine.

23. Room partition according to claim 12, wherein the endless element extends at least partially over an area of the magazine facing the guide track.

24. Room partition according to claim 23, wherein each wall element is hung on at least two suspension assemblies, which are moved in the guide track and rotate around a plurality of suspension bolts.

25. Room partition according to claim 24, wherein the magazine includes at least two tracks, running parallel to each other, that adjoin the guide track either rectangularly or transversely and whose distance from each other is calculated in such a manner that, in each case, only one suspension assembly of one wall element present in the magazine is guided in one of the tracks.

26. Room partition according to claim 25, wherein the endless element extends at each side of the branch point of a track from the guide track.

27. Room partition according to claim 26, wherein the connecting means are developed in such a way that the wall elements are connected with each other, one after another, when moved out of the magazine, and again detached from each other when moved into the magazine.

28. Room partition according to claim 27, wherein, as connecting means for a detachable front side connection of the wall elements with each other, a plurality of pins and eyes are provided, each of the pins on the wall element is aligned with one of the eyes on the adjacent wall element, and are inserted into the eye.

29. Room partition according to claim 28, in wherein the wall elements are movable in the magazine either rectangularly or transversely to the guide track, wherein the pins basically extend in a direction of the movement of the wall elements in the magazine.

30. Room partition according to claim 29, the hooks are provided as connecting means for a detachable front side connection of the wall elements.

31. Room partition according to claim 30, wherein connecting means are attached to the front side of the wall elements for a detachable front side connection of the wall elements with each other.

32. Room partition according to claim 31, wherein the guide track runs either straight or at least in a slight curve.

* * * * *